US008165884B2

(12) United States Patent
Sanchez

(10) Patent No.: US 8,165,884 B2
(45) Date of Patent: Apr. 24, 2012

(54) LAYERED PROMPTING: SELF-CALIBRATING INSTRUCTIONAL PROMPTING FOR VERBAL INTERFACES

(75) Inventor: Russell I. Sanchez, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 692 days.

(21) Appl. No.: 12/031,938

(22) Filed: Feb. 15, 2008

(65) Prior Publication Data

US 2009/0210232 A1 Aug. 20, 2009

(51) Int. Cl.
*G10L 15/22* (2006.01)
*G10L 21/00* (2006.01)
(52) U.S. Cl. ...... 704/270; 704/275; 704/247; 379/88.22
(58) Field of Classification Search .............. 704/270, 704/275, 247
See application file for complete search history.

(56) References Cited

U.S. PATENT DOCUMENTS

| | | | | |
|---|---|---|---|---|
| 5,553,121 A * | 9/1996 | Martin et al. | ............ | 379/88.01 |
| 5,592,583 A * | 1/1997 | Sakurai | ............ | 704/200 |
| 5,745,877 A | 4/1998 | Nijmam et al. | ............ | 704/270 |
| 6,334,103 B1 * | 12/2001 | Surace et al. | ............ | 704/257 |
| 6,647,363 B2 | 11/2003 | Claassen | ............ | 704/1 |
| 6,711,543 B2 | 3/2004 | Cameron | ............ | 704/270 |
| 6,743,175 B2 | 6/2004 | Greenberg | ............ | 600/437 |
| 7,024,366 B1 * | 4/2006 | Deyoe et al. | ............ | 704/270.1 |
| 7,107,217 B2 | 9/2006 | Watanabe et al. | ............ | 704/270 |
| 7,143,039 B1 | 11/2006 | Stifelman et al. | ............ | 704/270 |
| 7,742,580 B2 * | 6/2010 | Cooper et al. | ............ | 379/88.22 |
| 2002/0059073 A1 | 5/2002 | Zondervan et al. | ........ | 704/270.1 |
| 2003/0016793 A1 | 1/2003 | Balentine et al. | .......... | 379/88.16 |
| 2004/0037434 A1 | 2/2004 | Balentine et al. | .............. | 381/82 |
| 2005/0238145 A1 | 10/2005 | Knott et al. | ................. | 379/88.01 |
| 2006/0085192 A1 | 4/2006 | Davis et al. | ................... | 704/257 |

OTHER PUBLICATIONS

McQueen, R. J. (1989) "A primer on human-computer interface" New Zeland Journal of Computing V. 1, No. 1, pp. 39-45.*
Carroll et al.; "*Interface Design Issues for Advice-Giving Expert Systems*"; 1987; 9 pgs.; http://delivery.acm.org/10.1145/10000/7886/p14-carroll.pdf?key1=7886&key2=0322818711&coll=GUIDE&dll=GUIDE&CFID=17866335&CFTOKEN=14541208.
Knox et al.; "*Directed Dialogue Protocols: Verbal Data for User Interface Design*"; 1989; 3 pgs.; http://delivery.acm.org/10.1145/70000/67503/p283-knox.pdf?key1=67503&key25493818711&coll=GUIDE&d1=GUIDE&CFID=17286036&CFTOKEN=40030580.
Nishimoto et al.; *Measurement of Workload for Voice User Interface Systems*; 19 pgs.; http://hil.t.u-tokyo.ac.jp/~nish/2004/Nishimoto2004-scj-draft.pdf.

* cited by examiner

*Primary Examiner* — Vincent P Harper
(74) *Attorney, Agent, or Firm* — Merchant & Gould

(57) ABSTRACT

A plurality of prompting layers configured to provide varying levels of detailed assistance in prompting a user are maintained. A prompt from a current prompting layer is presented to a user. Input is received from the user. A level of detail in prompting the user is adaptively changed based on user behavior. Upon the user making a hesitant verbal gesture that reaches a threshold duration, a transition is made from the current prompting layer to a more detailed prompting layer. Upon the user interrupting the prompt with a valid input, a transition is made from the current prompting layer to a less detailed prompting layer.

20 Claims, 9 Drawing Sheets

LAYERED PROMPTING: SELF-CALIBRATING INSTRUCTIONAL PROMPTING FOR VERBAL INTERFACES

BACKGROUND

Verbal interfaces and other non-visual interfaces allow users to control devices and systems without taking their eyes or their hands away from other activities. However, a concern in deploying non-visual interfaces is the lack of discoverability of the functions or options available to the user. A textual or other visual user interface may be configured to display one or more menus that show at a glance the options available to the user. A visual interface may also present help information if the user is not familiar with how to use the interface. By contrast, a verbal interface cannot simultaneously present multiple options and/or information in parallel. Instead, verbal interfaces present options serially by playing a recording of the options or otherwise reading the options to the user.

Serially presenting lists of options and other information may be time consuming. Having to present a long list of options may be avoided by separating the list into a hierarchy of shorter lists. Related options may be subdivided into shorter sub-menus accessible through a master menu that lists the groups of options available through the sub-menus. However, in a verbal interface supporting many functions, a user still may have to listen to long lists of options and/or navigate through several menus to secure information about a desired option. The time involved in working with such list may even trouble a beginning user who might need and appreciate the information provided. On the other hand, experience users may be frustrated with the tedium in having to engage one or more menus to initiate a desired function.

Generally, there is no way for the system to infer the user's skill level, if the user is asked to self-identify his or her familiarity level with the system and underestimates or overestimates his or her skill level, the user may become very frustrated in being given too much prompting or become confused upon receiving too little assistance, respectively. In addition, if a user has a higher familiarity with one aspect of the system but little or no experience with another aspect of the system, the level of prompting appropriate for the user with the first part of the system may leave the user utterly lost in another part of the system. Further, a user who has past familiarity with the system but needs to refresh his or her recollection of the system may only desire some minor prompting or assistance. If such a user selects to receive novice-level prompting, the user might receive too much information and lose too much time, and the user may not be able to or know how to scale back to less detailed prompting during the current session or the next session.

One way to avoid the potential problem of providing too much or too little information is to provide a selectable help option. With a help option available, minimal prompting may be provided. Thus, a user who does not need assistance need not invoke the help option; on the other hand, a less-experienced user who needs more assistance than the minimal amount provided can request more help. Unfortunately, providing a help option does not resolve all possible problems. For example, an experienced user might need just a little help in being reminded of the possible options available at some point, and being presented with a detailed set of explanations from a help system may be more than the user wants. Conversely, a novice user may not know or remember how to invoke a help option, thus, while help might be available, a novice may not be able to access it.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to computer-implemented methods, computer-readable media and systems for adapting a level of detail in prompting a user. A plurality of prompting layers configured to provide varying levels of detailed assistance in prompting a user are maintained. A prompt from a current prompting layer is presented to a user. Input is received from the user. A level of detail in prompting the user is adaptively changed based on user behavior. Upon the user making a hesitant verbal gesture that reaches a threshold duration, a transition is made from the current prompting layer to a more detailed prompting layer. Upon the user interrupting the prompt with a valid input, a transition is made from the current prompting layer to a less detailed prompting layer.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. The first digit in each of the three-digit reference numerals refers to the figure in which the referenced element first appears.

DETAILED DESCRIPTION OF IMPLEMENTATIONS

This detailed description describes implementations of layered prompting. In one implementation, prompting may be provided in the form of verbal prompts for use in a verbal interface. Notwithstanding, layered prompting is applicable in any context in which a user's actions manifest a familiarity with the system that would suggest that the user may benefit from being provided with more detailed prompts and/or might appreciate being presented with less detailed prompts.

Illustrative Operating Environment

Figure 1:
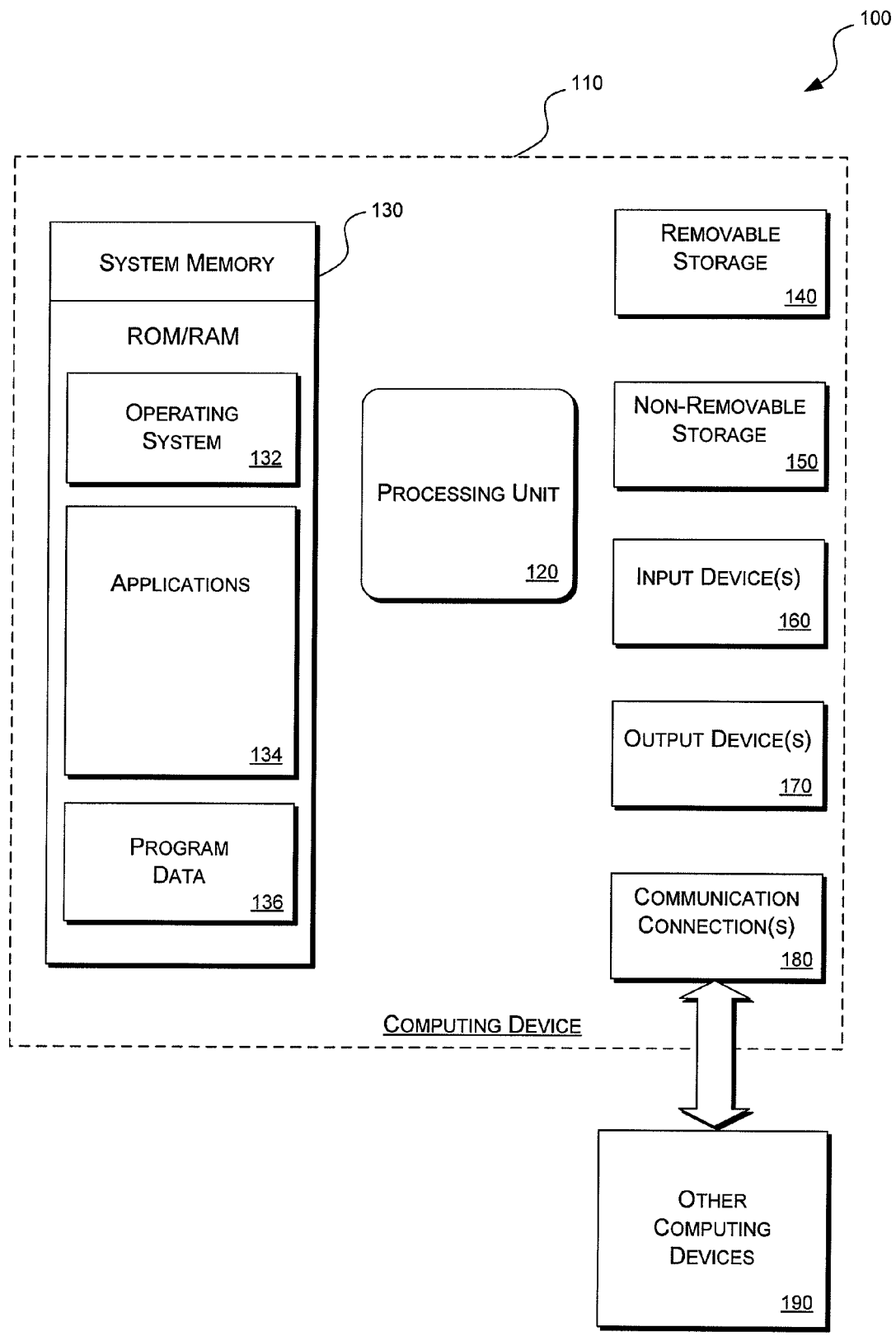
FIG. 1 is a block diagram of a generalized computing operating environment facilitating implementations of computer-implemented methods, computer-readable media, and systems for layered prompting as herein described.

Implementations of layered prompting may be supported by a number of different computing environments. FIG. 1 is a generalized block diagram of a representative operating environment 100.

Referring to FIG. 1, an exemplary operating environment 100 includes a computing device, such as computing device 110. In a basic configuration, the computing device 110 may include a stationary computing device, a mobile computing device, or an earpiece-mounted device, as further described with reference to FIG. 2. The computing device 110 typically includes at least one processing unit 120 and system memory 130. Depending on the exact configuration and type of computing device, the system memory 130 may be volatile (such as random access memory or "RAM"), non-volatile (such as read-only memory or "ROM," flash memory, and similar memory devices that maintain the data they store even when power is not provided to them) or some combination of the two. The system memory 130 typically includes an operating system 132, one or more applications 134, and may include program data 136.

The computing device 110 may also have additional features or functionality. For example, the computing device 110 may also include removable and/or non-removable additional data storage devices such as magnetic disks, optical disks, tape, and standard-sized or miniature flash memory cards. Such additional storage is illustrated in FIG. 1 by removable storage 140 and non-removable storage 150. Computer storage media may include volatile and/or non-volatile storage and removable and/or non-removable media implemented in any method or technology for storage of information such as computer-readable instructions, data structures, program modules or other data. The system memory 130, the removable storage 140 and the non-removable storage 150 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 110. Any such computer storage media may be part of the device 110. The computing device 110 may also have input device(s) 160 such as a keyboard, mouse, pen, voice input device, touch input device, etc. Output device(s) 170 such as a display, speakers, printer, etc. may also be included.

The computing device 110 also contains one or more communication connections 180 that allow the device to communicate with other computing devices 190, such as over a wired or a wireless network. The one or more communication connections 180 are an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Not all of the components or devices illustrated in FIG. 1 or otherwise described in the previous paragraphs are necessary to support a layered prompting system. For example, a handheld or wearable device may include a single system memory 130 comprised of a flash memory configured to store an operating system, one or more applications, and all program data. A compact device may or may not include removable storage 150. In addition, the communication connection 180 may include only a Bluetooth® radio transceiver and/or a Universal Serial Bus (USB) connection port for backup, update, and networking functions.

Exemplary Environment for Using Layered Prompting with Verbal Interfaces

Figure 2:
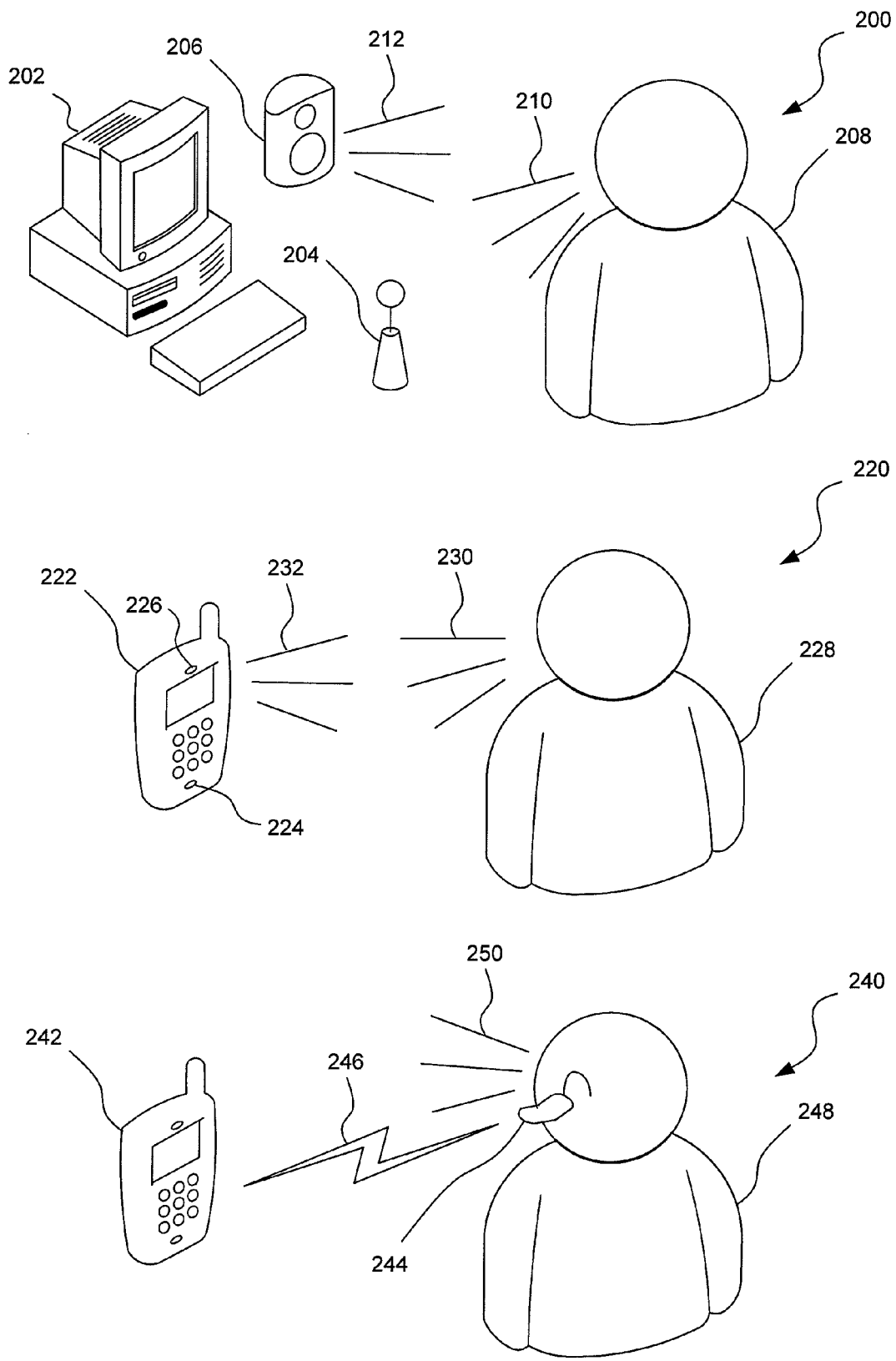
FIG. 2 is block diagram of exemplary contexts for deploying implementations of layered prompting.

FIG. 2 illustrates three sample operating environments in which layered prompting might be employed in a verbal interface. A computer-based environment 200 may include a computer 202, which may be a desktop, laptop, notebook, or palm-top computer. The computer 202 may be equipped with one or more microphones 204 to receive auditory input and one or more speakers 206 to issue verbal prompts and confirmations and provide other auditory information. The microphone 204 and speaker 206 may be peripherals of the computer 202 communicating with the computer 202 using wired or wireless communication.

In a non-portable environment, multiple microphones 204 and speakers 206 may be disposed throughout a room, office, home, or other user environment to facilitate verbal interaction with the computer 202. One or more microphones 204 and speakers 206 may be located remotely from the computer 202 to allow the user 208 to interact with the computer via the verbal interface without the user being in close proximity to the computer. Alternatively, in a portable environment, the microphone 204 and one or more speakers 206 may be integrated within the computer 202 (not shown in FIG. 2). Further alternatively, the microphone 204 and one or more speakers 206 may be included in a wired or wireless headset (not shown in FIG. 2) worn by a user 208.

The user interacts with the computer by providing auditory input 210 including, for example, verbal commands and other auditory content to the computer 202 via the microphone 204 and receiving auditory information 212 from the computer 202 via the speaker 206. Implementations of layered prompting control the auditory information 212 provided by the computer 202 in response to the auditory input 210 as will be described below.

A portable environment 220 also may support implementations of layered prompting. In an exemplary portable environment 220, a portable computing device 222, such as a personal digital assistant (PDA), a handheld personal computer, or a mobile telephone (as shown in (FIG. 2) is configured to receive auditory input and implement layered prompting. In the exemplary portable environment 220, a user 228 provides auditory input 230 to the portable computing device 222 which receives the auditory input via a microphone 224 and receives prompts and other auditory information 232 via a speaker 226.

A wearable environment 240 also may support implementations of layered prompting. In an exemplary wearable environment 240, a user employs a wearable device 244 configured to receive auditory information 250 from the user via a built-in microphone and present prompts and other auditory information via a built-in speaker. The wearable device 244 may take the form of a wired or wireless earpiece or headset of the type used with a wired telephone or a mobile device 242 such as a mobile telephone, and a portable music player or other devices.

In the wearable environment 240, the wearable device 244 may be a standalone device configured to assist the user in information storage and retrieval applications. The wearable device 244 may support these functions in addition to serving as a headset for another device such as the mobile device 242. The wearable device 244 may communicate with the mobile device 242 through a wired connection or a wireless connection 246. When the wearable device 244 is configured to communicate with the mobile device 242, layered prompting and other storage and retrieval applications for auditory information may be supported within the wearable device 244, on the mobile device 242 (wherein the wearable device 244 serves as a microphone and a speaker for the user 248), or by some combination of the wearable device 244 and the mobile device 242.

Input and output devices for a computer 202, portable computing device 222, or a mobile device 242 and/or wearable device 244 are not limited to speakers and microphones, however. Just to name a few examples, the systems 202, 222, and 242-244, or other systems, could communicate with a user to receive input and present input using a conventional telephone landline, voice over Internet protocol (VOIP) telephony, or any communications or telecommunications device that facilitates allows verbal or auditory communication.

Sample Layers Used in Layered Prompting

Figure 3:
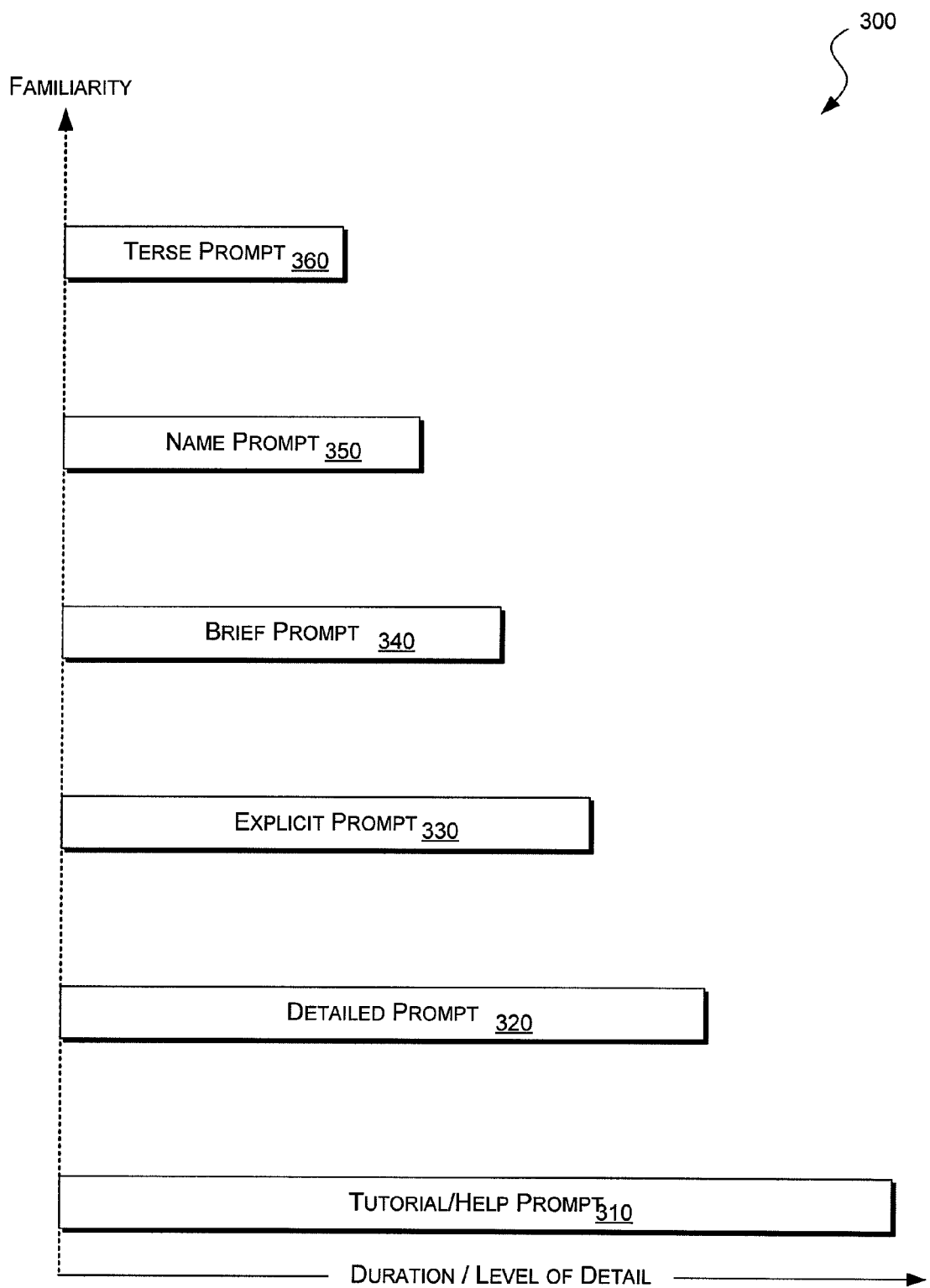
FIG. 3 is a block diagram depicting a plurality of exemplary prompting levels.

FIG. 3 graphically depicts a set of prompting layers 300 that may be presented in an implementation of layered prompting. Information made available to assist a user of a non-textual interface, such as a verbal interface, is divided into separate layers of detail. An object of presenting the information in differently detailed layers is to provide a user with a level of help that is sufficiently detailed to assist the user without providing more help than the user needs and, thus may only unnecessarily consume the user's time.

As will be further described below, an implementation of layered prompting infers the user's level of familiarity in using the verbal interface system based on the user's behavior. When a user hesitates while performing a function, for example, the system may conclude that the user would benefit from more detailed prompting. In inferring that the user has a lower familiarity level, the system transitions to a next more detailed layer of prompting or successively more detailed layers of prompting. On the other hand, a user's lack of hesitation, which may be manifested by the user interrupting a prompt to present commands or arguments before the prompting is completed, indicates the user may have a level of familiarity with the system that does not warrant a current level of prompting. The system then may transition to one or more less detailed levels of prompting to avoid presenting the user with unnecessary detail that may only consume the user's time.

Referring again to FIG. 3, the exemplary set of prompting layers 300 includes six separate layers of prompting although a set of layered prompting may include any number of layers corresponding to the different levels of prompting it may be desirable to provide. A most detailed prompting layer, the tutorial or help prompt layer 310, is depicted as a lowest prompting layer in the set of prompting layers 300 to suggest that the tutorial or help prompt layer 310 is suitable for a person with a lowest level of familiarity with the system. On the other hand, a least detailed prompting layer, the terse prompt layer 360, is depicted as a highest prompting layer to suggest that the highest prompting layer is suitable for a person with a highest familiarity with the system.

The lowest, most-detailed level of prompting is the tutorial or help prompt layer 310. The tutorial or help local prompt 310 provides the most assistance with regard to a particular topic to assist persons with the familiarity with or recollection of how to use the system. The tutorial or help layer 310 may include a complete description of a function, what the function does, how to use the function, and samples of how the function operates and what information or confirmations may be generated. The tutorial/help layer 310 may even include workbook-type exercises, inviting the user to respond to determine if the user understands how to engage the system and provide reinforcement.

The next less detailed level of prompting is a detailed prompt layer 320. The detailed prompt layer 320, for example, may fully describe the functions available to a user at a current point with an explanation of how to use the functions. The detailed prompt layer 320 also may provide the syntax for each of those functions and one or more usage examples. In one implementation, the detailed prompt layer might present up to a paragraph or a few paragraphs describing use of each function.

The next less detailed level of prompting is an explicit prompt layer 330. The explicit prompt layer 330 provides a short description explaining what functions or options are available to the user and what inputs or arguments are expected. The prompting provided from the explicit prompt layer 330 might be up to a sentence or a few sentences describing what the user is currently able to do and how to do it.

A next less detailed level of prompting is the brief prompt layer 340. The brief prompt layer 340 may present only a few words to remind the user what inputs are available or expected.

A next less detailed level of prompting is the name prompt layer 350. The name prompt layer only lists the names of functions available to the user.

Finally, a least detailed level of prompting is the terse prompt layer 360. The terse prompt layer 360 does not provide any explanatory information. The terse prompt layer 360 merely causes a word to be said (e.g., "Ready," "Okay," or "Go ahead") or causes a noise to be generated (e.g., a confirming beep or tone) to invite a command or confirm that the last command has been received and acknowledged.

Again, the concept of using multiple layers of prompts is to provide an appropriate layer of prompting for persons with varying levels of familiarity with the system. The level of familiarity attributed to the user is inferred from the user's use or behavior. In one implementation, when a system is first activated or a user first uses the system, the user is assumed to have little or no familiarity with the system and will be presented with the most detailed level of prompting from the tutorial/help prompt layer 310. Then, as the user's behavior manifests that the user may have or be developing a greater familiarity with the system, the system transitions the user to one or more successively less detailed layers of prompting. Conversely, when the user's behavior communicates that the user may have a lesser degree of familiarity with the system, the system may transition the user to one or more successively more detailed layers of prompting. The user behavior from which the familiarity is inferred is explained in the next section.

Inferring Familiarity Level from User Behavior

FIGS. 4-7 illustrate how implementations of layered prompting respond to user behavior. By way of overview, implementations of layered prompting presented prompts based on an attributable level of familiarity with the system inferred from the user's hesitancy or rapidity in executing functions or responding to prompts. Implementations of layered prompting infer that a user who makes a hesitant verbal gesture may lack familiarity with the system. For example, hesitant verbal gestures may include not giving input, i.e., by pausing at the end of a prompt. However, a pause is not the only form of hesitant verbal gesture that may manifest a lack of familiarity. The user may repeat a command multiple times, indicating that while the user may know a command, but not know what options or arguments the command takes. Also, if the user stutters, stammers, or presents insubstantial or null speech, such as by uttering "um" "er" or other sounds a user makes when trying to formulate a thought, these utterances also may manifest a lack of familiarity with the system and a need for assistance. Further, the user may say words such as "help," "more," or other words that represent a request for assistance. In any of these examples or other hesitant verbal gestures, the system can adapt the level of prompting provided.

On the other hand, when a user responds quickly, interrupting a prompt with a valid input or presenting a valid input even before a prompt is presented, the user's behavior manifests a higher degree of familiarity with the system. One should note that one only wants to respond to a valid input as indicating a higher degree of familiarity with the system; a user responding with words or such as "help" or words and sounds that do not represent valid inputs may actually indicate a lack of familiarity with the system.

As a user's skill improves with experience, declines over time with nonuse, etc., implementations of layered prompting are adaptive to adjust the level of prompting provided. An initial prompting level is established based on the user being a new user, recognized as an experienced user, recognized as an experienced user who has not used the system for an extended time, etc.

Figure 4:
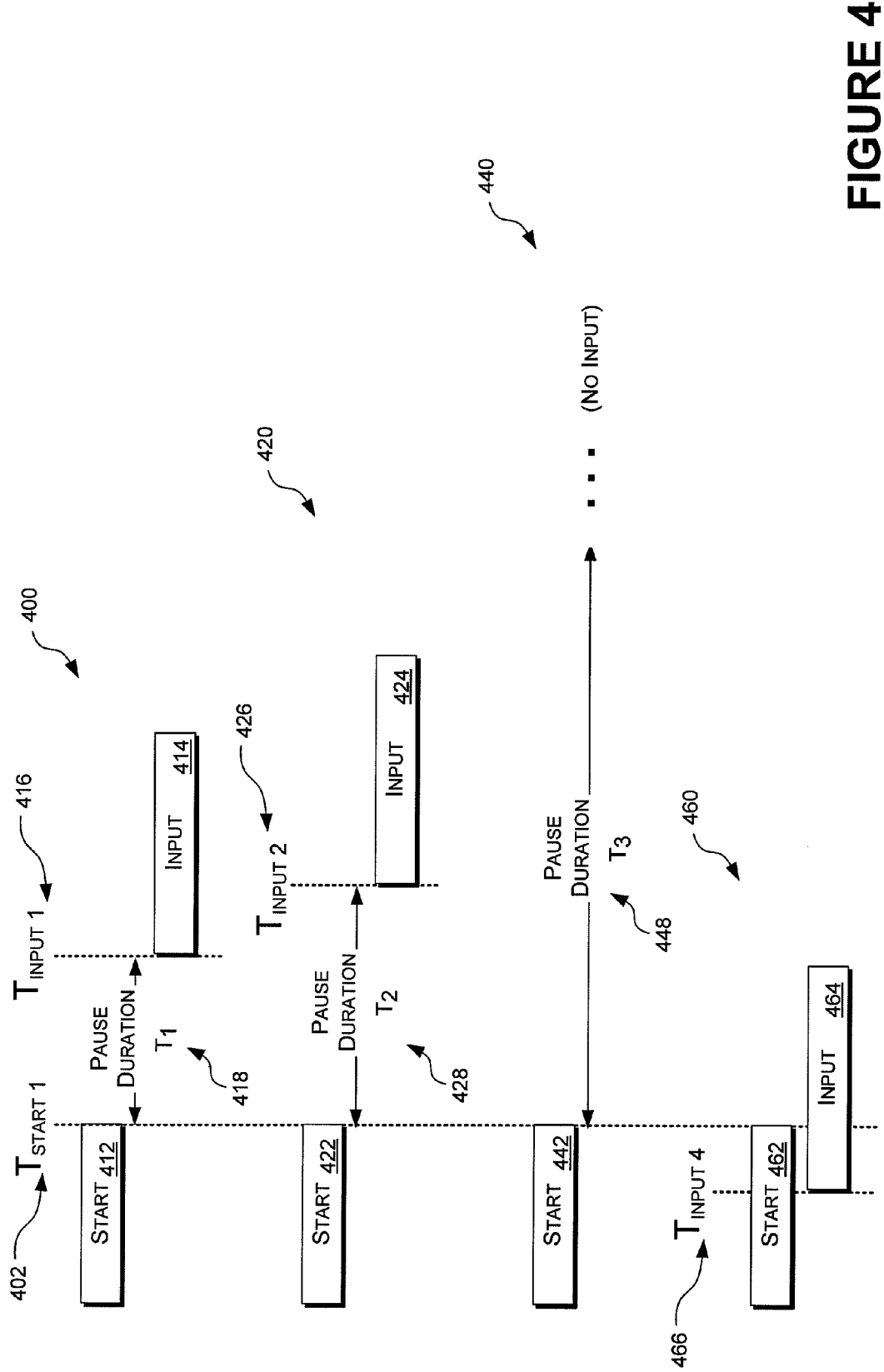
FIGS. 4-7 are block timing diagrams illustrating transitioning between prompting layers based on timing of user inputs.

FIG. 4 illustrates examples of how a user may respond to a system prompt and what the system may infer from the user's response. In example 400, a start prompt 412 is presented to the user. The start prompt 412 may include a verbal prompt to solicit a user response, a tone or a beep to signal that the system is ready to receive input, or some other start message. The start prompt 412 concludes at time $T_{start\ 1}$ 402, from which point a user's response time is measured. In the following examples, a pause in the user's response is used as a representative hesitant verbal gesture to which implementations of layered prompting adaptively provide more detailed layers of prompting to provide assistance. However, one must note that a pause is only one form of a hesitant verbal gesture that may initiate the presentation of more detailed prompting. As previously mentioned, inappropriately repeating a command, stuttering, stammering, insubstantial null speech, and other such behavior may be identified as indicating a user's lack of familiarity in interacting with the system.

At time $T_{input\ 1}$ 416, the user responds with an input 414, resulting in a pause between the end of the start prompt 412 at $T_{start\ 1}$ 402 and $T_{input\ 1}$ 416 of a duration $T_1$ 418. The pause duration $T_1$ 418, based on comparison with an expected response threshold, may be considered a normal reaction time.

In example 420, start prompt 422 is presented to the user and concludes at time $T_{start\ 1}$ 402. (The same start time $T_{start\ 1}$ 402 is used for each example for purposes of comparison.) At time $T_{input\ 2}$ 426, the user responds with an input 424, resulting in a pause between the end of the start prompt 412 at $T_{start\ 1}$ 402 and $T_{input\ 2}$ 426 of a duration $T_2$ 428. As shown in FIG. 4, the pause duration $T_2$ 428 is longer than the pause duration $T_1$ 418 in example 400. In comparison with an expected response threshold (not shown in FIG. 4), the longer duration of pause $T_2$ 428 may be considered as a delayed response, indicating some hesitancy on the part of the user.

Such hesitation, whether manifested as a pause or as another hesitant verbal gesture, may indicate that the user lacks experience with the system. Alternatively, the hesitation may reflect that, while the user is familiar with the system, the user has not recently used the system or has been distracted during the session. Further alternatively, the hesitation may imply a lack of familiarity with a particular function even though the user may not hesitate at all when using functions with which the user is more familiar. In any case, such user hesitation is taken as a reflection that the user will benefit from additional prompting.

In example, 440, start prompt 442 is presented to the user and concludes at time $T_{start\ 1}$ 402. Unlike examples 400 and 420, in example 440, the user presents no input and provides no response at all after hearing the start prompt 442. The lengthy pause duration $T_3$ 448 from the end of the start prompt 442 concludes at $T_{start\ 1}$ 402 may reflect that the user has no idea how to respond and may have no familiarity the system.

In example 460, in contrast with the previous examples, while the start prompt 462 is being presented to the user and before the start prompt 462 would conclude at time $T_{start\ 1}$ 402, the user responds at time $T_{input\ 4}$ 466 with an input 466. In example 460, not only is there no pause between the start prompt 462 and the input 466, but the user actually interrupts the start prompt 462. Implementations of layered prompting, upon being interrupted by a user, are configured to allow the system to be interrupted and halt presentation of the prompt. Interrupting the start prompt 462 indicates that the user may be highly familiar with the system and knows just what he or she wants to do, thus needing or wanting little or no prompting.

However, it is possible that the user may interrupt the prompt with an invalid response. For example, the user may interrupt with a response that indicates the user does not understand the prompt, by saying "what?" or "huh?" Similarly, the user may respond with null speech, such as an "um" or an "er." Also, the user may be interrupted by another person speaking to the user, and the user may respond to that other person in a way that is not responsive to the system. Thus, implementations of layered prompting may continue to present a current level of prompting, such as by continuing to present a prompt or replaying a prompt from its beginning when a user interrupts if the interruption does not present a valid command or action recognized by the system.

Figure 5:
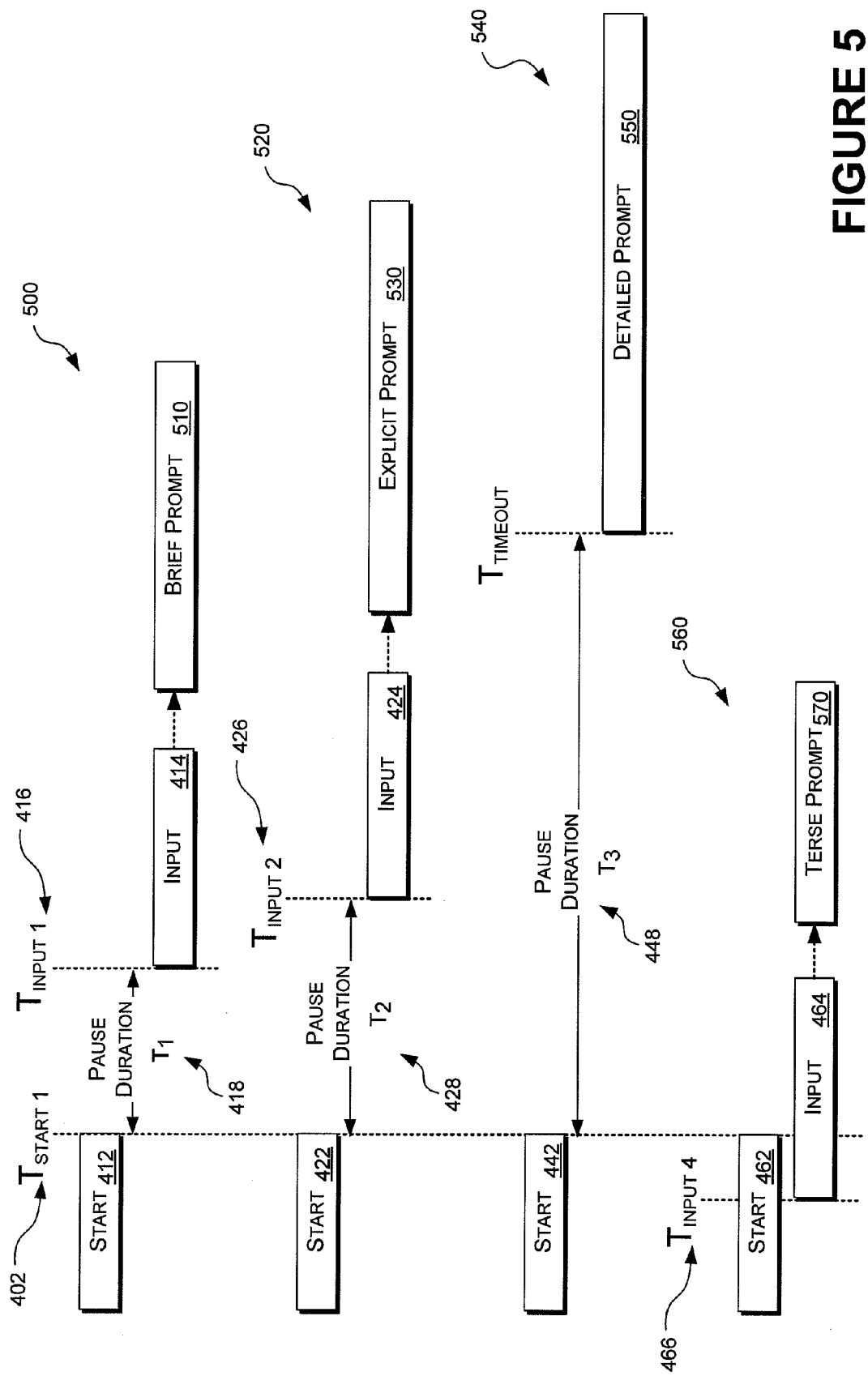

FIG. 5 illustrates how implementations of layered prompting may prompt a user based on the level of user familiarity manifested in the user's response to a previous prompt. Examples 500, 520, 540, and 560 each show an example of how a system adapts its prompting based on the user behavior represented in examples 400, 420, 440, and 460, respectively.

In the examples of FIG. 5, it is assumed that the user is recognized by the system as having some familiarity with the system and, thus, the default layer of prompting is the brief prompting layer and the adapting of the prompting layers is made in response to the initial start prompt 412. However, these assumptions are made just for purposes of example. Implementations of layered prompting are applicable to any initial or default level of prompting. Moreover, layered prompting provides for the adaptation of prompting based on user behavior at any point, not just in response to an initial start prompt. Implementations of layered prompting may adapt the prompting multiple times during a single session in response to the user's behavior, regardless of the familiarity level previously attributed to the user at an earlier point.

Referring to FIG. 5, in example 500, the user responded to the start prompt 412 with an input 414 at $T_{input\ 1}$ 416 after a pause of duration $T_1$ 418. The pause duration $T_1$ 418 was considered a normal reaction time. As a result, the system may determine that the current layer of prompting is appropriate. Because the initial layer of prompting was the brief prompting layer, the system responds to the user's input 414 with a brief prompt 510.

In example 520, the user responded with an input 424 resulting in a pause of a duration of $T_2$ 428 between the end of the start prompt 422 at $T_{start\ 1}$ 402 and $T_{input\ 2}$ 426. The pause duration $T_2$ 428 was considered a delayed response, indicating some hesitancy on the part of the user. Because of this hesitancy, the system may determine the user would benefit from more detailed prompting. The system thus transitions from a brief prompting layer to a next more detailed prompting layer, such as the explicit prompting layer. The system thus generates an appropriate prompt 530 from the explicit prompting layer.

In example 540, in which the user never responded to the start prompt 442, the system may infer that the user has no familiarity with the system or, at least, has no familiarity with functions and options currently available to the user. After a pause of an extended duration, such as pause duration $T_3$ 448, the system may transition to the next more detailed level of prompting, the detailed layer, and generate an appropriate, detailed prompt 550 from that layer.

Again, in the examples of FIGS. 4 and 5, a pause is used as a representative form of a hesitant verbal gesture that may indicate a lack of familiarity with the commands. Nonetheless, stuttering, stammering, repeating prompts, and insubstantial utterances or null speech, such as "uh," "er," or similar sounds may also represent and be taken as manifesting a user's lack of familiarity with the system. Thus, if instead of pausing for a time beyond a threshold duration, a user responded with "um . . . um" and failed to present a valid response recognized by the system, the user would respond in a similar was as the system responded to the representative pause.

As shown in example 560, just as implementations of layered prompting provide for transitioning to more detailed levels of prompting based on user behavior, implementations of layered prompting can transition to less detailed layers of prompting. In example 560, the user manifested a high level of familiarity with the system and presented an input 464 before the start prompt 462 had concluded. Based on the user's rapid response at $T_{input\ 4}$ 466, the system may infer that the user needs no explanatory prompting and may prefer not to even be presented with such prompting. As a result, the system may provide only a terse prompt 570. Again, whether the user is transitioned to a less-detailed level of prompting may depend not just upon the user interrupting the prompt but upon the user interrupting the prompt with a valid input or command.

Figure 6:
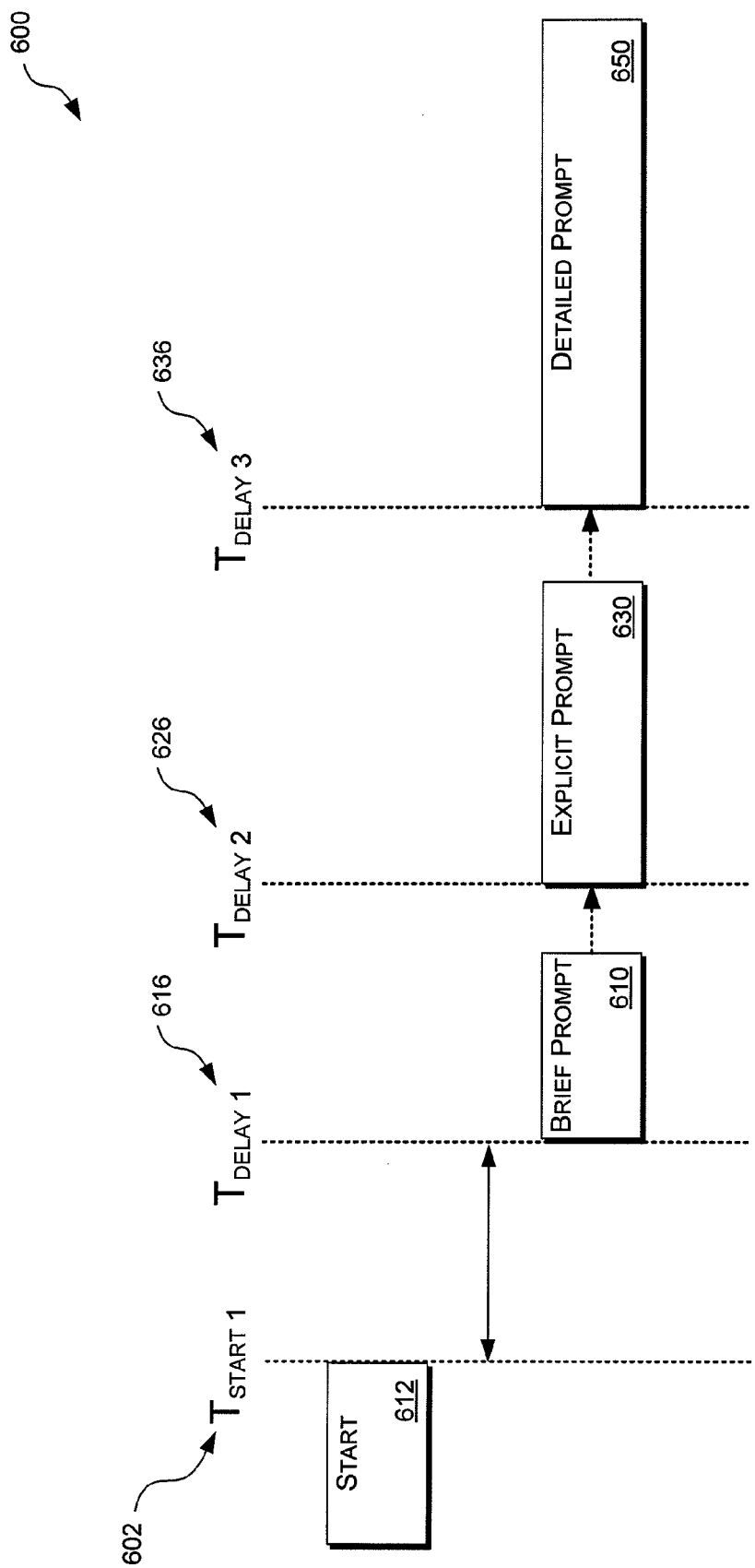

As shown in FIG. 6, implementations of layered prompting are not restricted to identifying and providing prompts only from a single layer. In a case in which a user is provided with a prompt at a particular level and responds with a hesitant verbal gesture rather than a valid response, the system may continue to present successively more detailed prompts from other prompting layers. FIG. 6 shows an example 600 in which the user is presented with a start prompt 612 that ends at time $T_{start\ 1}$ when the system begins to measure delays in the user presenting a valid response. In the example 600, it is assumed that the current layer of prompting is the name layer and the start message 612 includes the appropriate prompt from the name prompt layer.

In the example 600, as in the examples 440 and 540, the user fails to validly respond to the start prompt 612. At a time $T_{delay\ 1}$ 616 when it is assumed the user might benefit from assistance beyond that provided in the start prompt 612, the system transitions to next more detailed layer of prompting which, in this case, is the brief prompting layer. The system thus presents an appropriate brief prompt 610 to the user.

After a further delay during which the user fails to validly respond, for example by not responding or responding with noises or words that do not represent valid commands, at a time $T_{delay\ 2}$ 626, the system transitions to an additional next more detailed layer of prompting, the explicit prompting layer. The system thus presents an appropriate, explicit prompt 630 to the user. Then, if the user continues not to respond, at a time $T_{delay\ 3}$ 636, the system transitions to a further next more detailed layer of prompting, the detailed prompting layer, and presents a detailed prompt 650 to the user. If the user continues not to respond, the system will eventually proceed to the tutorial or help layer to provide the user with initial or remedial training. Thus, implementations of layered prompting may be configured to transition between prompting layers to provide successively more detailed prompts based on a user's behavior.

One should note that, when a user's behavior indicates that he or she would benefit from tutorial/help-level prompting, implementations of layered prompting automatically transition to the tutorial/help prompting layer. In such implementations, the user need not use a separate help command to reach the tutorial/help level of prompting; the system will transition the user to the tutorial/help level of prompting as part of the layered prompting structure. The tutorial/help facilities of the system thus may be integrated with the layered prompting system.

Figure 7:
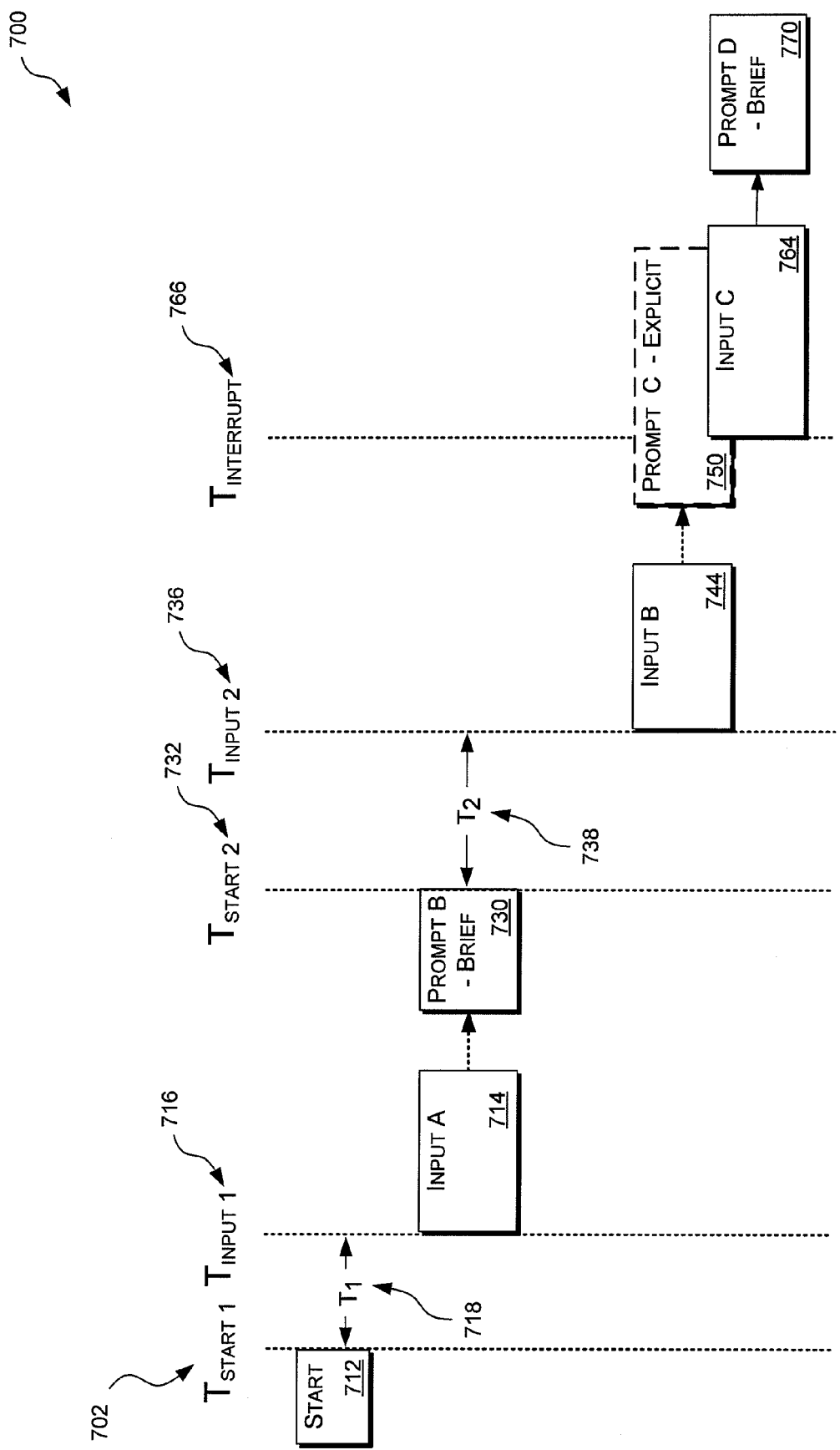

FIG. 7 illustrates that implementations of layered prompting are configured to adapt layers of prompting within a single session. Thus, as a user engages functions with which the user is more or less familiar, the user is not left with a single level of prompting when the user encounters more or less familiar situations. For this example, the initial prompting level is assumed to be the brief prompting layer.

In example 700 of FIG. 7, a start prompt 712 concludes at a time $T_{start\ 1}$ 702. At a time $T_{input\ 1}$ 716, after a pause of duration $T_1$ 718, a user provides an input, Input A 714. The pause of duration $T_1$ 718 is regarded to be a normal response time, thus, a next prompt, Prompt B—Brief 730, is presented from the brief prompting layer.

At a time $T_{input\ 2}$ 736, after a pause of duration $T_2$ 738, a user provides an input, Input B 744. The system regards the pause of duration $T_2$ 738, which was longer than the pause of duration $T_1$ 718, as manifesting some hesitancy on the part of the user. As a result, the system transitions to a next more detailed layer of prompting, the explicit prompting layer, and a next prompt, Prompt C—Explicit 750 is presented to the user.

Whatever the cause of the relatively longer duration of the pause $T_2$ 738, during the presentation of the next prompt, Prompt C—Explicit 750, the user interrupts the prompt with Input C 764 at a time $T_{interrupt}$ 766. Based on the rapidity of the user's response, which may be measured relative to a start time of the interrupted prompt 750 or another point in time, the system may infer that the user needs or desires less detailed prompting. As previously described, the user may have hesitated longer in responding to Prompt B—Brief 730 because the user was distracted or was using a function with which the user had a lesser level of familiarity.

However, while Prompt C—Explicit 750 was being presented, the user might be more focused or be facing more familiar options and, thus, the user interrupts the prompt. Based on the rapidity of the user's response, the system may transition the user to a next less detailed prompting layer and present a user with Prompt D—Brief 770. Alternatively, based on the user's response, the system may skip one or more prompting layers.

Figure 8:
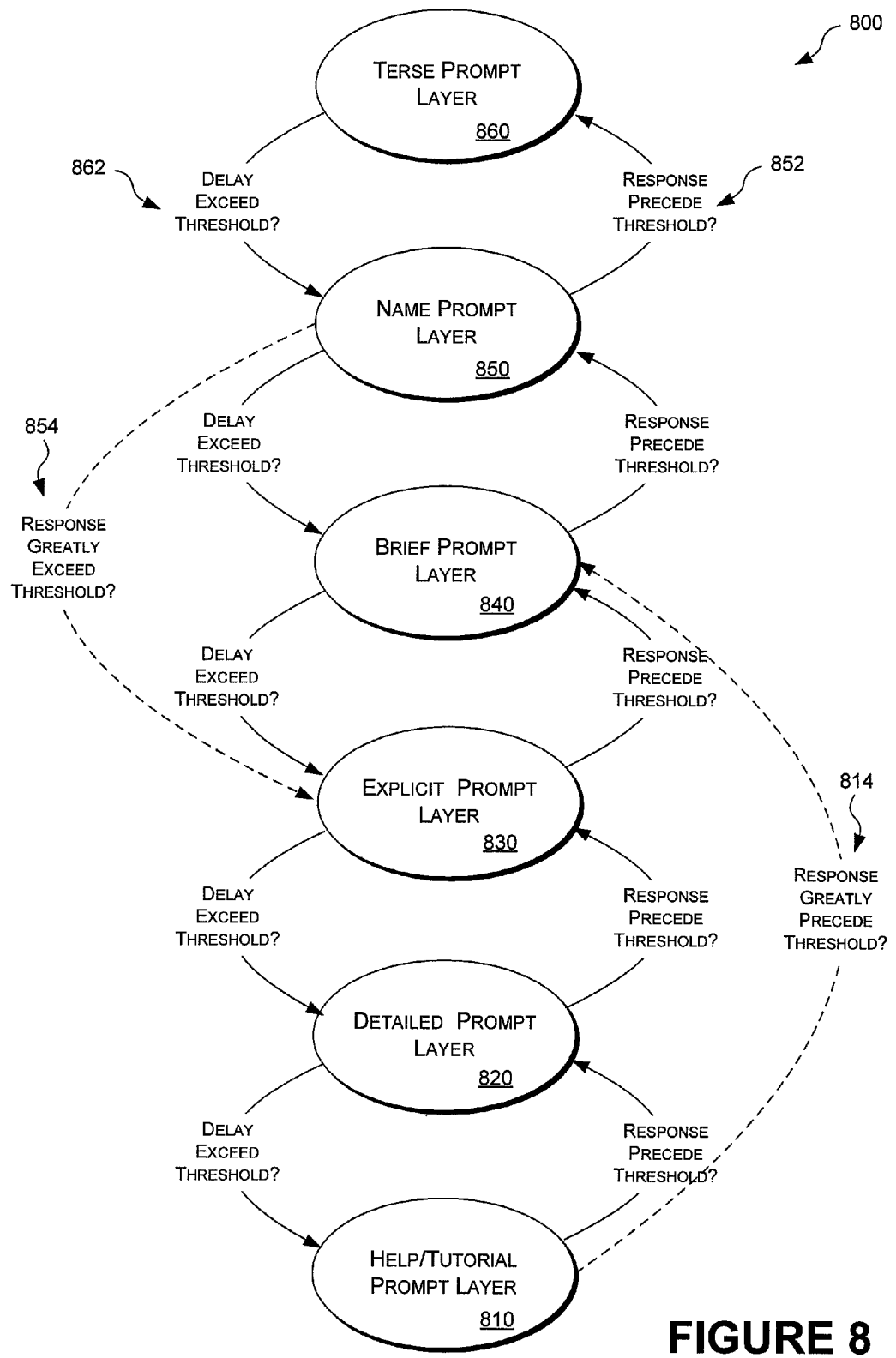
FIG. 8 is a state diagram illustrating state changes between prompting layer states.

FIG. 8 presents a state diagram 800 that summarizes how a system may respond to user behavior. The state diagram includes six exemplary states ranging from a state providing the most detailed prompting to a state providing the least detailed prompting: a tutorial/help layer state 810, a detailed prompt layer state 820, an explicit prompt layer state 830, a brief prompt layer state 840, a name prompt layer state 850, and a terse prompt layer state 860. The states correspond with the respective exemplary prompting layers of FIG. 3.

As described previously, when an implementation of layered prompting operates at a particular state, it may transition to a more detailed prompting layer or a less detailed prompting layer based on the user's behavior. For example, if a user is currently being prompted from the terse prompt layer state 860, but it is determined at 862 that a user's response came after a delay exceeding a determined threshold, the state may transition to the name prompt layer state 850. The system will then present a next prompt to the user from the name prompt layer. On the other hand, a user currently being prompted from the name prompt layer state 850 may provide a rapid response that interrupts a name-level prompt. If it is determined at 852 that a user's response interrupted a previous response or otherwise preceded an expected threshold, the state may transition to the terse prompt layer state 860. The system will then present a next prompt from the terse prompt layer.

Implementations of layered prompting are not restricted to transitioning one state at a time. For example, as shown in the state diagram 800, if the system currently prompts a user from the name prompt layer state 850, it may be determined at 854 that the next user response exceeds a secondary delay threshold or otherwise greatly exceeds an established response threshold. In this case, the state may transition to the explicit prompt layer state 830, bypassing the brief prompt layer state 840. Correspondingly, if the system currently prompts a user from the tutorial/help layer state 810, it may be determined at 814 that the next user response immediately interrupts a next prompt or otherwise greatly precedes a response threshold. In this case, the state may transition to the brief prompt layer state 840, bypassing the detailed prompt layer state 820 and the explicit prompt layer state 830.

Implementations of layered prompting also may respond in other ways or respond to other indicia of a user's familiarity. For example, when a user interrupts a prompt, a system may not transition to a next less detailed prompting layer until the user has interrupted a number of prompts. As a result, a user may still be prompted in a way that is consistent with a currently attributable familiarity level until it the user's behavior establishes that the user manifests a familiarity level that justifies transitioning to a next less detailed prompting layer.

In addition, a user's familiarity may be evaluated based on other indicia. For example, a user may have a high familiarity level with the system but may tend not to interrupt prompts or tend to pause for a seemingly extended interval before responding to a prompt. Notwithstanding the lack of rapidity of the user's response, the user may then provide a complete input including a command and all the relevant arguments without any additional prompting. The completeness of the response, after one or a number of such responses, may be taken as an indicator that the system should transition the user to next less detailed layers of prompting.

Additional Features and Examples of Layered Prompting

The following description provides examples of user interaction with a voice interface system to illustrate features of layered prompting.

Layered prompting may include a number of limited repetition prompts that may be associated with one or more prompting layers. For example, when a system has just been activated or is being operated by a new user, the system may provide one or more prompts to help the user acclimate to the system. After time, however, these prompts may be discontinued. For example, for a specified number of repetitions, the system may provide these prompt:

"To learn how to use one of my features, speak the name of the feature or ask for 'other features.' Or just keep listening and I'll explain how I work. Feel free to interrupt me or say "cancel" at any time."

"I help you remember things! You can use all my features using only your voice. For example, to dial a number, say 'System, dial,' then speak the digits. To remember something, say 'System, remember,' then say something to remember. To search for something you asked me to remember, say 'System, search,' then say something to search for. To use one of those features (or just hear about it), say the feature name now say 'dial', 'remember', or 'search.'."

"See your manual for more information on using the System."

"Would you like me to <System lists a yes/no command option>? Please specify 'yes' or 'no.'"

After a certain number of repetitions, these clarifying prompts may taper off or be discontinued entirely. Presumably, after a certain number of repetitions, some of these messages will no longer be helpful or, worse, become irritating.

Implementations of layered prompting also can allow or respond to null inputs and guide a user with conversational cues. For example, if a user does not reply to a prompt with a command, but utters a reflexive word or sound such as "okay," "um," or "hmm," layered prompting can be configured to consider this null speech as manifesting a hesitant verbal gesture, indicating the user may need or want more detailed prompting. On the other hand, this null speech could be identified as manifesting a user's normal usage pattern even if it does not serve to engage system functions. In other words, instead of considering the utterance of an "um" as a pause or delay in responding, the system may regard the null speech as signifying an introduction to a non-null input. Thus, a user who tends to insert null words or sounds will not continually be presented with prompting from successively more detailed prompt layers.

Users who are presenting inputs also may be motivated by conversational cues. In ordinary interaction, when one person tells another a story, the listener may respond with terms or sounds that indicate understanding, such responsive phrases or utterances "uh-huh," "okay," "yes," "go on," "I see," "hmm," and similar utterances. Implementations of layered prompting may exploit this aspect of human interaction by including these conversational cues while a user is initiating a function. Thus, for example, if a user is entering a list of items to be remembered, such as a shopping list, once the user initiates a "remember" function, implementations of layered prompting may respond with an "okay." Then, as items for the shopping list are presented, the system may acknowledge each with an "uh-hum," or a "yes." Correspondingly, in a pattern-based, voice driven system, pauses may be interposed to delineate between items in a list. Such pauses should not be considered as hesitancy manifesting a need for more detailed prompting. Such pauses between entries, at least for some duration, should be disregarded in monitoring the user's familiarity level.

The following paragraphs provide some illustration of how implementations of a layered prompting system may interact with a user to provide appropriate prompting. In these examples, it is assumed the user engages the system by saying the word "System." However, in order to avoid engaging the system each time one uses the word "system" in conversation, a more unique term may be desired to activate the system.

Assume that a new user only knows how to activate the system by saying "System," and does so. The current, default level of help may be the brief prompting layer. After the user speaks "System," the system may respond as described below. (In the following examples, the hesitant verbal gesture used is a pause, although other hesitant verbal gestures may initiate more detailed prompting as previously described.)

System: Yes?
<Further Pause Detected—Transition to Explicit Prompting>
System: As long as you are silent, I'll go ahead and describe my basic features. Feel free to interrupt me or say 'cancel' at any time. After saying, 'System,' say 'dial,' 'remember,' or 'search.' To hear about one of these features, just say the name and I'll tell you how to use it . . . say 'dial', 'remember', 'search', or 'other features' . . . or just keep listening and I'll give you an overview of how I work.
<Further Pause Detected—Transition to Detailed Prompting>
System: I am a memory tool. All my functions operate completely by your spoken command. I can also record your notes—think of it as a voice sticky note. You can search for them later.
<Further Pause Detected—Transition to Tutorial/Help Prompting>
System: Let's try out some of the System's features, try saying the word 'Remember' now . . . .
<Tutorial Continues>

On the other hand, if a user is gaining familiarity with the system, the prompting level may become less detailed. In a similar example, assume the user is currently being prompted at the detailed level of prompting:

System: I am a memory tool. All my functions operate completely by your spok --
<User Interrupts Prompt>
User: Remember.
<System Transitions to Explicit Prompting>
System: Specify what it is you want the System to remember . . . .

In this example, the user interrupted with a valid input in the form of a recognized command. However, if the user had interrupted with an "um" or some invalid input, the system may be continued with the prompt or restarted the prompt.

Implementations of layered prompting provide numerous benefits. As users become more familiar with the system, prompting becomes less detailed, saving the user time and avoiding potential frustration. At the same time, when a novice user does not recall how to operate a particular function, layered prompting gives the user confidence that an explanation of how to proceed will be provided and the user is never left wondering what to do next.

Furthermore, the user never needs to request or navigate help—layered prompting automatically provides successively more detailed explanations to assist the user. All the user has to do to be presented with this assistance is remain silent. As each level of prompting is presented, it provides a stimulus for increasingly more detailed layers of prompting. For example, every time the user initiates the a feature, the user may first hear a terse acknowledgement, followed by a name of the function, followed by a brief prompt providing a few words explaining the function, etc. As a result, the next time the brief prompt is heard, it will may stimulate recollection of the more detailed prompts to assist the user recall what to do next. This naturally reinforcing process, in terms of being presented with the shorter prompt and, thus, shorter stimulus, will assist the user in remembering the content of the longer prompt.

Exemplary Operation of Layered Prompting

Figure 9:
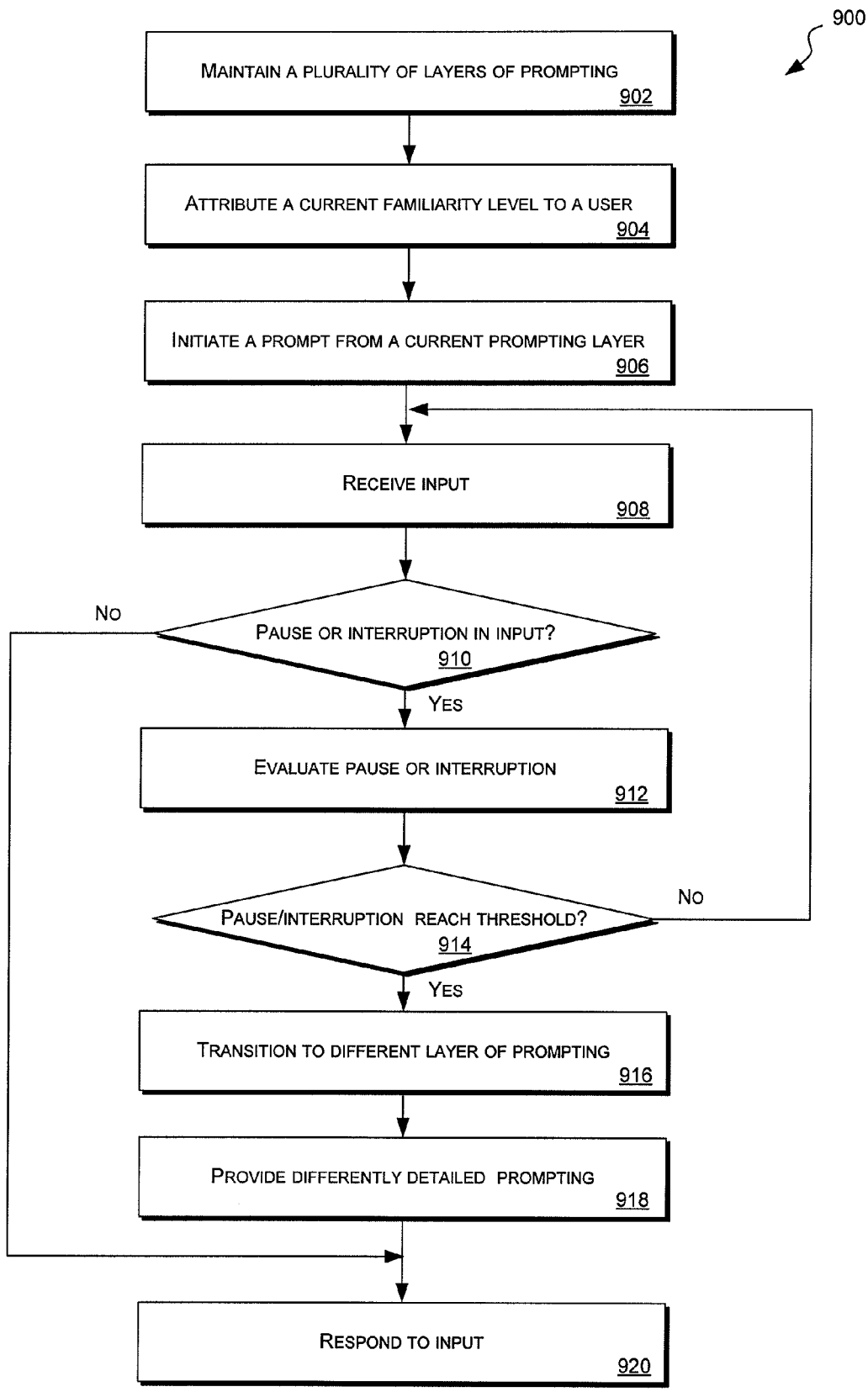
FIG. 9 is a flow diagram of a process of transitioning between prompting layers based on user behavior.

FIG. 9 presents a flow diagram 900 illustrating an example of the operation of a computer-implemented method of layered prompting, a computer-readable storage medium storing instructions allowing a computer system to perform layered prompting, and a system configured to support layered prompting.

At 902, a plurality of prompting layers is maintained. At 904, a current familiarity level in using the system is attributed to the user. At 906, a prompt from the current prompting layer is initiated. At 908, input is received.

At 910, it is determined whether the input was presented after a pause following the prompt or was presented so as to interrupt the prompt. (In the flow diagram, a pause is representative of a plurality of hesitant verbal gestures and it is assumed the interruption includes a valid input.) If not, the flow diagram 900 proceeds to 920 to respond to the input. However, if a possible interruption was identified at 910, at 912, the pause or an interruption with a valid input is evaluated. At 914, for example, it is determined if the pause exceeded a threshold duration or if the interruption truncated the prompt short of a threshold. If not, the flow diagram 900 continues at 908 with the system continuing to receive input. On the other hand, if the pause or interruption surpasses the threshold evaluated at 914, at 916, a transition is made to a different prompting layer. As previously described, a pause in the user input may result in a transition to a more detailed prompting layer. On the other hand, when the user interrupts a prompt, a transition may be made to a less detailed prompting layer.

At 918, differently detailed prompting from the new prompting layer is provided. When the input indicates the user would benefit from additional prompting, more detailed prompting may be presented at this point. On the other hand, such as in the case were a user has interrupted a prompt, no further prompting may be warranted at this time. Accordingly, the differently detailed level of prompting will be provided the next time the user is prompted. At 920, the system responds to the user input.

The process illustrated in the flow diagram 900 may cycle repeatedly as desired.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-implemented method, comprising:
configuring a system to provide auditory stimulus and act on auditory input;
maintaining verbal prompting layers for a function supported by the system comprising: a name prompt presenting names of the function; a brief prompt explaining function; an explicit prompt explaining a syntax of the function; a detailed prompt describing the operation of the function; and a tutorial prompt guiding the user through one or more steps in using the function, each of the verbal prompting layers being associated with an attributable familiarity level of a user and being configured to communicate varying levels of explanatory detail to provide assistance to the user in performing the function;
associating a current verbal prompting layer with the user;
initiating a prompt to for the auditory input;
receiving the auditory input;
identifying a timing event in presentation of the auditory input including:
 a hesitant verbal gesture between a completion of the prompt and a start of the auditory input including identifying:
  a failure to respond;
  nonsubstantive speech;
  repetition of a verbal command; and
  a request for assistance; and
 an interruption of the prompt by the start of a valid auditory input;
evaluating the timing event relative to a threshold associated with transitioning to a next verbal prompting layer;
when the timing event surpasses a threshold, transitioning the current verbal prompting layer to a next verbal prompting layer such that the level of explanatory detail changes for the function; and
presenting an audible prompt from the next verbal prompting layer.

2. The computer-implemented method of claim 1, wherein:
when the identified timing event includes the hesitant verbal gesture and the hesitant verbal gesture reaches a duration exceeding the threshold, selecting a more detailed verbal prompting layer as the next verbal prompting layer; and
when the identified timing event includes the interruption of the prompt ahead of the threshold, selecting a less detailed verbal prompting layer as the next verbal prompting layer.

3. The computer-implemented method of claim 2, further comprising, when the timing event includes the hesitant verbal gesture and the hesitant verbal gesture reaches an additional threshold:
transitioning to a successively more detailed verbal prompting layer; and
presenting an additional audible prompt from the successively more detailed verbal prompting layer.

4. The computer-implemented method of claim 3, wherein the hesitant verbal gesture includes one of a succession of hesitant verbal gestures and an extended hesitant verbal gesture, automatically transitioning to a most detailed verbal prompting layer.

5. The computer-implemented method of claim 2, further comprising, when the hesitant verbal gesture includes the pause and fails to reach of the duration exceeding the threshold and occurs between content entries related to the function, treating the pause as a delimiter between the content entries.

6. The computer-implemented method of claim 1, wherein the verbal prompting layers further comprise:
a terse prompt acknowledging availability of the function; and
a brief prompt explaining function.

7. The computer-implemented method of claim 1, further comprising generating conversational cues acknowledging the receiving of the auditory input.

8. The computer-implemented method of claim 1, further comprising:
including one or more introductory prompts associated with at least one of the verbal prompt layers and configured to provide introductory information to the user;
monitoring a number of times the one or more introductory prompts has been presented; and
after the one or more introductory prompts has been presented a predetermined number of times, discontinuing presentation of the one or more introductory prompts.

9. The computer-implemented method of claim 1, further comprising one of:
maintaining the current verbal prompting layer associated with the user between sessions; and
when a time between sessions exceeds a nonuse interval, transitioning the current verbal prompting layer to a more detailed verbal prompting layer.

10. A computer-readable storage medium that is tangible storing instructions executable by a computing system to generate a result, comprising:
maintaining verbal prompting layers for a function supported by a system to provide auditory stimulus and act on auditory input comprising: a name prompt presenting names of the function; a brief prompt explaining function; an explicit prompt explaining a syntax of the function; a detailed prompt describing the operation of the function; and a tutorial prompt guiding the user through one or more steps in using the function, each of the verbal prompting layers being associated with an attributable familiarity level of a user and being configured to communicate varying levels of explanatory detail to provide assistance to the user in performing the function;
associating a current verbal prompting layer with the user;
initiating a prompt to for the auditory input;
receiving the auditory input;
identifying a timing event in presentation of the auditory input including:
 a hesitant verbal gesture between a completion of the prompt and a start of the auditory input including identifying:
  a failure to respond;
  nonsubstantive speech;
  repetition of a verbal command; and
  a request for assistance; and
 an interruption of the prompt by the start of a valid auditory input;
evaluating the timing event relative to a threshold associated with transitioning to a next verbal prompting layer;
when the timing event surpasses a threshold, transitioning the current verbal prompting layer to a next verbal prompting layer such that the level of explanatory detail changes for the function; and
presenting an audible prompt from the next verbal prompting layer.

11. The computer-readable storage medium of claim 10, wherein:
when the identified timing event includes the hesitant verbal gesture and the hesitant verbal gesture reaches a duration exceeding the threshold, selecting a more detailed verbal prompting layer as the next verbal prompting layer; and
when the identified timing event includes the interruption of the prompt ahead of the threshold, selecting a less detailed verbal prompting layer as the next verbal prompting layer.

12. The computer-readable storage medium of claim 11, further comprising, when the timing event includes the hesitant verbal gesture and the hesitant verbal gesture reaches an additional threshold:
  transitioning to a successively more detailed verbal prompting layer; and
  presenting an additional audible prompt from the successively more detailed verbal prompting layer.

13. The computer-readable storage medium of claim 10, wherein the verbal prompting layers further comprise:
  a terse prompt acknowledging availability of the function; and
  a brief prompt explaining function.

14. The computer-readable storage medium of claim 10, further comprising:
  including one or more introductory prompts associated with at least one of the verbal prompt layers and configured to provide introductory information to the user;
  monitoring a number of times the one or more introductory prompts has been presented; and
  after the one or more introductory prompts has been presented a predetermined number of times, discontinuing presentation of the one or more introductory prompts.

15. The computer-readable storage medium of claim 10, further comprising one of:
  maintaining the current verbal prompting layer associated with the user between sessions; and
  when a time between sessions exceeds a nonuse interval, transitioning the current verbal prompting layer to a more detailed verbal prompting layer.

16. A system, comprising:
  a processor and a computer-readable storage medium;
  the processor configured to perform actions, comprising:
    maintaining verbal prompting layers for a function supported by a system to provide auditory stimulus and act on auditory input comprising: a name prompt presenting names of the function; a brief prompt explaining function; an explicit prompt explaining a syntax of the function; a detailed prompt describing the operation of the function; and a tutorial prompt guiding the user through one or more steps in using the function, each of the verbal prompting layers being associated with an attributable familiarity level of a user and being configured to communicate varying levels of explanatory detail to provide assistance to the user in performing the function;
  associating a current verbal prompting layer with the user;
  initiating a prompt to for the auditory input;
  receiving the auditory input;
  identifying a timing event in presentation of the auditory input including:
    a hesitant verbal gesture between a completion of the prompt and a start of the auditory input including identifying:
      a failure to respond;
      nonsubstantive speech;
      repetition of a verbal command; and
      a request for assistance; and
    an interruption of the prompt by the start of a valid auditory input;
  evaluating the timing event relative to a threshold associated with transitioning to a next verbal prompting layer;
  when the timing event surpasses a threshold, transitioning the current verbal prompting layer to a next verbal prompting layer such that the level of explanatory detail changes for the function; and
  presenting an audible prompt from the next verbal prompting layer.

17. The system of claim 16, wherein:
  when the identified timing event includes the hesitant verbal gesture and the hesitant verbal gesture reaches a duration exceeding the threshold, selecting a more detailed verbal prompting layer as the next verbal prompting layer; and
  when the identified timing event includes the interruption of the prompt ahead of the threshold, selecting a less detailed verbal prompting layer as the next verbal prompting layer.

18. The system of claim 16, wherein the verbal prompting layers further comprise:
  a terse prompt acknowledging availability of the function; and
  a brief prompt explaining function.

19. The system of claim 16, further comprising:
  including one or more introductory prompts associated with at least one of the verbal prompt layers and configured to provide introductory information to the user;
  monitoring a number of times the one or more introductory prompts has been presented; and
  after the one or more introductory prompts has been presented a predetermined number of times, discontinuing presentation of the one or more introductory prompts.

20. The system of claim 16, further comprising one of:
  maintaining the current verbal prompting layer associated with the user between sessions; and
  when a time between sessions exceeds a nonuse interval, transitioning the current verbal prompting layer to a more detailed verbal prompting layer.

* * * * *